(12) United States Patent
Lalor (10) Patent No.: US 8,336,245 B2
(45) Date of Patent: *Dec. 25, 2012

(54) REMOTE CONTROL SYSTEM FOR CONTROLLING A REMOTE ANIMAL COLLAR

(75) Inventor: Tom Lalor, North Vancouver (CA)

(73) Assignee: Alpine Trust, North Vancouver (CA)

( * ) Notice: Subject to any disclaimer, the term of this patent is extended or adjusted under 35 U.S.C. 154(b) by 203 days.

This patent is subject to a terminal disclaimer.

(21) Appl. No.: 12/484,008

(22) Filed: Jun. 12, 2009

(65) Prior Publication Data
US 2009/0249677 A1 Oct. 8, 2009

Related U.S. Application Data

(63) Continuation-in-part of application No. 12/030,549, filed on Feb. 13, 2008.

(51) Int. Cl.
F41C 27/00 (2006.01)
A01K 15/02 (2006.01)
A01M 31/00 (2006.01)

(52) U.S. Cl. .......................................... 42/90; 119/720

(58) Field of Classification Search ............... 42/90, 99; 119/720, 772, 776, 792, 795
See application file for complete search history.

(56) References Cited

U.S. PATENT DOCUMENTS

| | | | |
|---|---|---|---|
| 2,800,104 A | 7/1957 | Cameron et al. | |
| 3,183,618 A * | 5/1965 | Flewellen | 42/75.01 |
| 3,336,530 A | 8/1967 | Sloan et al. | |
| 3,608,524 A | 9/1971 | Waltz | |
| 4,095,163 A | 6/1978 | Montague | |
| 4,539,937 A | 9/1985 | Workman | |
| 4,626,848 A | 12/1986 | Ehlers | |
| 4,802,482 A | 2/1989 | Gonda et al. | |
| 4,996,945 A | 3/1991 | Dix, Jr. | |
| 5,425,330 A | 6/1995 | Touchton et al. | |
| 5,448,847 A * | 9/1995 | Teetzel | 42/70.11 |
| 5,584,137 A * | 12/1996 | Teetzel | 42/117 |
| 5,606,306 A | 2/1997 | Mutoh et al. | |
| 5,666,908 A | 9/1997 | So | |
| 5,857,433 A * | 1/1999 | Files | 119/720 |
| 5,905,623 A | 5/1999 | McCartney | |

(Continued)

FOREIGN PATENT DOCUMENTS
AU 2005100421 A4 6/2005
(Continued)

OTHER PUBLICATIONS

Office Action dated Nov. 9, 2011, U.S. Appl. No. 12/030,549, 8 pages.

Primary Examiner — Bret Hayes
(74) Attorney, Agent, or Firm — Klarquist Sparkman, LLP (57) ABSTRACT

A remote control system is disclosed for controlling a remote animal collar of the type which includes one or more electrodes or sensors which protrude from the inside surface of the collar for contacting the neck of the animal and electronic devices located within the body of the collar to receive electronic control signals or sensor input and to generate a stimulus, which is transmitted to the animal through the electrodes or by a speaker or other devices on the collar. The remote control system uses a master and slave remote transmitter combination.

25 Claims, 7 Drawing Sheets

U.S. PATENT DOCUMENTS

| | | |
|---|---|---|
| 6,019,066 A | 2/2000 | Taylor |
| 6,116,201 A | 9/2000 | LaBelle |
| 6,230,014 B1 | 5/2001 | Freeze et al. |
| 6,297,731 B1 | 10/2001 | Flick |
| 6,327,999 B1 | 12/2001 | Gerig |
| 6,431,122 B1 | 8/2002 | Westrick et al. |
| 6,459,378 B2 | 10/2002 | Gerig |
| 6,519,083 B2 * | 2/2003 | Heinrich .................. 359/422 |
| 6,598,563 B2 * | 7/2003 | Kim et al. ................. 119/720 |
| 6,624,758 B1 | 9/2003 | Omata et al. |
| 6,725,810 B2 * | 4/2004 | Schwartz .................. 119/720 |
| 6,726,072 B2 * | 4/2004 | Rugh ........................ 224/269 |
| 6,799,537 B1 * | 10/2004 | Liao .......................... 119/720 |
| 6,813,025 B2 * | 11/2004 | Edwards ................... 356/422 |
| 6,886,287 B1 * | 5/2005 | Bell et al. .................. 42/120 |
| 2002/0050249 A1 | 5/2002 | Grimsley et al. |
| 2002/0079909 A1 | 6/2002 | Reeves |
| 2003/0110675 A1 * | 6/2003 | Garrett et al. ............. 42/85 |
| 2003/0116101 A1 | 6/2003 | Kim et al. |
| 2003/0226305 A1 * | 12/2003 | Burnett ...................... 42/90 |
| 2005/0024226 A1 | 2/2005 | Hayes et al. |
| 2005/0145201 A1 | 7/2005 | Gillis et al. |
| 2005/0162282 A1 | 7/2005 | Dresti et al. |
| 2005/0172912 A1 | 8/2005 | Crist et al. |
| 2005/0217606 A1 | 10/2005 | Lee et al. |
| 2006/0164383 A1 | 7/2006 | Machin et al. |
| 2006/0169222 A1 | 8/2006 | Gerig |
| 2006/0181428 A1 | 8/2006 | Blaker et al. |
| 2007/0022994 A1 | 2/2007 | Moskun |
| 2007/0080934 A1 | 4/2007 | Chen et al. |
| 2007/0214698 A1 * | 9/2007 | Hung et al. ................ 42/111 |
| 2007/0221139 A1 | 9/2007 | Reinhart |
| 2008/0028663 A1 * | 2/2008 | Day ............................ 42/122 |
| 2008/0055147 A1 | 3/2008 | Van |
| 2008/0068207 A1 | 3/2008 | Elberbaum |
| 2008/0157983 A1 | 7/2008 | Dir et al. |
| 2008/0165249 A1 | 7/2008 | DeKeyser |
| 2008/0236514 A1 | 10/2008 | Johnson et al. |
| 2009/0199786 A1 * | 8/2009 | Lalor ......................... 119/720 |
| 2009/0287363 A1 * | 11/2009 | Young ....................... 701/2 |
| 2009/0295616 A1 | 12/2009 | Martin |

FOREIGN PATENT DOCUMENTS

| | | |
|---|---|---|
| CN | 1390087 A | 1/2003 |
| WO | WO 96/39679 | 12/1996 |

* cited by examiner

REMOTE CONTROL SYSTEM FOR CONTROLLING A REMOTE ANIMAL COLLAR

CROSS REFERENCE TO RELATED APPLICATION

This application is a continuation-in-part of U.S. patent application Ser. No. 12/030,549, filed on Feb. 13, 2008, which is hereby incorporated by reference.

FIELD

The present invention relates to a remote controlled system for controlling remote animal collars of the type which include one or more electrodes or sensors which protrude from the inside surface of the collar for contacting the neck of the animal and electronic devices located within the body of the collar to receive electronic control signals or sensor input and to generate a stimulus, which is transmitted to the animal through the electrodes or by a speaker or other devices on the collar. In particular, the invention relates to a remote control system for controlling remote animal collars of this type which uses a master and slave remote transmitter combination.

BACKGROUND

Hunters and animal trainers require easier ways to control their animals while hunting and training. Remote controlled collars are therefore convenient and well known, permitting the hunter or trainer to remotely activate stimulation devices such as electrodes or speakers mounted on the collar. However, the remote transmitters for such remote controlled collars are bulky and can be difficult for the hunter or trainer to handle in an active field situation.

For example, in a hunting situation, a dog will often become conditioned by the movement of the hunter's weapon as he gets ready to shoot. The dog learns that once the weapon is raised what follows is gunfire and a bird falling. However, this conditioning may cause the dog to "break" or "go before commanded". Such "breaking" is a problem because the dog's movement causes the birds to flare up and spoil the shoot. In some cases, the dog may even chase the birds before they are shot. To correct this problem, hunters often use remote controlled electronic collars of the kind described above to stop the dog from moving as the hunter's gun moves or the birds flush. However, it is almost impossible to correct the dog in time with a bulky remote control transmitter located in the hunter's pocket, since the hunter has to let go of his gun, find the remote transmitter, get it out of his pocket, and then find and press the correct button.

It is well known that animal behavior can be modified either with positive or negative stimulation, provided the stimulation takes place at or near the same time as the occurrence of the behavior. Remote controlled electronic collars, often called "e-collars", were developed for dog trainers so that they could make quick corrections. To be effective, these corrections must be made within 0.25 to one second after the behavior seeking to be modified. If correction occurs outside this one second window, it will be ineffective in modifying the behavior. In some cases, applying a correction beyond the one second window may unintentionally reinforce another behavior. E-collars work very well provided they are used within this time period.

As mentioned above, this problem is most acute in a hunting scenario, since the hunter's hands are generally fully occupied holding the weapon and it is not easy to access the transmitter to make a correction in less than one second. In fact, it is generally accepted that such corrections cannot easily be made in less than three seconds. This delay in applying stimulation to the animal renders it nearly impossible to successfully modify animal behavior. For example, for a dog running at 44 feet per second, the dog would travel two thirds the length of a football field, before correction could be applied. By that time, the dog is unable to associate the stimulation to the offensive behavior.

As a further example, a hunter wanting to stop his dog from jumping out of a boat on a missed shot, needs to stimulate the dog at the instant the dog makes its first move to leave the boat. This is not possible if the hunter's hands are occupied holding his weapon and the remote transmitter is in his pocket. By the time the hunter is able to access the transmitter, the dog will be in the water and likely approaching the decoys. Stimulating the dog at this later point could result in the dog being conditioned to stay away from the decoys rather than preventing him from exiting the boat. This would result in the dog being reluctant to pick up any birds downed near the decoy area.

One solution is described in U.S. Pat. No. 6,830,014 to Lalor, the disclosure of which is incorporated herein by reference. Lalor discloses a remote control transmitter that includes a vibration sensor, thereby permitting remote control signals to be sent to the animal collar by tapping the remote transmitter. Lalor also discusses using voice recognition circuits to control the remote transmitter. These solutions have disadvantages. The former still requires that the hunter have at least one hand free to control the remote transmitter. In a hunting situation or other activities, the hunter's hands may be occupied with other devices such as guns, game calls, leashes or various combinations of such devices, and it may be difficult to access the master transmitter in time to make an animal correction. In the latter solution, the use of verbal commands in a hunting situation may not be suitable as any sound could scare the hunted prey.

Accordingly, there is a need for a remote control system that can be used to control a remote animal collar that solves the problems presented by the existing devices. There is a need for a remote control system that can be activated without sound and without the hunter or trainer having to remove his hands from his weapon. There is a need for a system that provides the hunter or trainer the ability to control the collar to stimulate the animal within the one second window mentioned above so as to give the animal an opportunity to effectively associate the objectionable behavior with the stimulation. There is a further need for a remote control system that allows the hunter to handle a gun in a safe manner while still being able to apply an effective corrective stimulation to an animal.

SUMMARY

The applicant's present remote control system as described herein addresses the above problems by providing a remote control system for controlling a remote animal collar, the animal collar comprising one or more stimulation devices for providing stimulation to the animal and receiver circuits for receiving master control signals for controlling the stimulation devices, the remote control system comprising: a slave transmitter for transmitting slave control signals; and a master transmitter for receiving the slave control signals and for transmitting the master control signals to the animal collar for controlling the stimulation devices.

In other aspects, the master transmitter may have a transmission range of up to about one mile and the slave transmitter may have a transmission range of up to about 30 feet. The slave transmitter is advantageously sufficiently small in size so that it may be mounted on a portable device such as a hand held hunting weapon, a key chain, a handling stick, a watch, or any other similar device. The slave transmitter may include an animal collar selector switch for selecting between one of multiple animal collars to control and a keypad for selecting a type, a level and/or a duration of the stimulation. The slave transmitter may be adapted for mounting in a convenient location on the portable device held by a user so that the user may easily activate the slave transmitter to send the slave control signals without releasing the user's hold on the portable device.

In a further aspect, there is provided a hunting weapon modified to facilitate the attachment of a slave transmitter or a slave transmitter holder, the slave transmitter adapted for transmitting slave control signals to a master transmitter, the master transmitter adapted for receiving the slave control signals and for transmitting the corresponding master control signals to a remote animal collar attached to an animal, the animal collar comprising one or more stimulation devices for providing a stimulation to the animal and receiver circuits for receiving master control signals for controlling the stimulation devices, the modified hunting weapon comprising: an attachment means for conveniently attaching the slave transmitter or slave transmitter holder to the hunting weapon in a location that facilitates easy and quick access to the slave transmitter by the hunter permitting the hunter to activate the remote animal collar within a selected time frame following a selected event, the selected time frame being sufficiently short so as to provide an effective correction to the animal following the selected event.

In yet another aspect, there is provided a modified stock for a hunting weapon, the stock modified to facilitate the attachment of a slave transmitter or a slave transmitter holder, the slave transmitter adapted for transmitting slave control signals to a master transmitter, the master transmitter adapted for receiving the slave control signals and for transmitting the corresponding master control signals to a remote animal collar attached to an animal, the animal collar comprising one or more stimulation devices for providing a stimulation to the animal and receiver circuits for receiving master control signals for controlling the stimulation devices, the modified stock comprising: an attachment means for conveniently attaching the slave transmitter or the slave transmitter holder to the stock in a location that facilitates easy and quick access to the slave transmitter by the hunter permitting the hunter to activate the remote animal collar within a selected time frame following a selected event, the selected time frame being sufficiently short so as to provide an effective correction to the animal following the selected event.

In another aspect, there is provided a modified transmitter for transmitting master control signals to a remote animal collar attached to an animal, the animal collar comprising one or more stimulation devices for providing a stimulation to the animal and receiver circuits for receiving master control signals for controlling the stimulation, the modified transmitter comprising: a basic transmitter component for transmitting the master control signals to the animal collar; and an adapter component, the adapter component comprising an adapter unit plug and adapter circuits required for permitting the attachment of a transmitter adapter unit to the basic transmitter, the transmitter adapter unit including all the necessary receiver circuits and software required to receive electronic slave control signals from a slave transmitter and for using those save control signals to control the output of the master control signals by the basic transmitter component to the animal collar.

It is to be understood that other aspects of the present remote control system will become readily apparent to those skilled in the art from the following detailed description, wherein various embodiments are shown and described by way of illustration. As will be realized, the remote control system is capable of other and different embodiments and its several details are capable of modification in various other respects, all without departing from the spirit and scope of the remote control system described. Accordingly, the drawings and detailed description are to be regarded as illustrative in nature and not as restrictive.

BRIEF DESCRIPTION OF THE DRAWINGS

Referring to the drawings wherein like reference numerals indicate similar parts throughout the several views, several aspects of the applicant's remote control system are illustrated by way of example, and not by way of limitation, in detail in the figures, wherein.

DETAILED DESCRIPTION

The applicant's remote control system will now be described with reference to specific embodiments. With reference to FIGS. 1 to 5, the applicant's remote control system is advantageous for use in controlling remote animal collars such as remote collar 10 shown affixed to an animal 12 in FIG.

Figure 5:
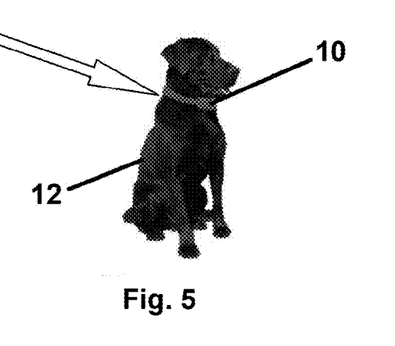
FIG. 5 shows an animal wearing an electronic remote controlled collar.

5. The remote animal collar 10 may include one or more electrodes or sensors which protrude from the inside surface of the collar for contacting the neck of the animal and electronic devices located within the body of the collar to receive electronic master control signals or sensor input and to generate a stimulus, which is transmitted to the animal through the electrodes, or by a speaker or a spray device located on the collar. The remote animal collar 10 includes a power supply.

Figure 1:
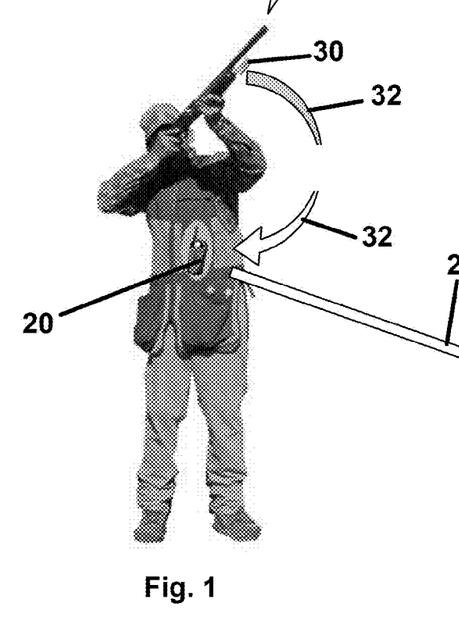
FIG. 1 shows a hunter with a master transmitter located in his pocket and a slave transmitter located on his weapon.

As shown in FIG. 1, the applicant's remote control system includes a master transmitter 20 for sending electronic master control signals 22 to be received by the remote animal collar 10 to control the type, amount and duration of the stimulus given to the animal. The master control signals 22 may be in the form of radio frequency signals, infrared signals or any other suitable control signals. The master transmitter 20 includes high power circuits capable of transmitting electronic master control signals to the remote animal collar 10 at a frequency of about 27 Mhz (or some other suitable frequency), to a range of up to about one mile. The master transmitter includes a micro processor, a keypad with buttons for controlling the type, level and duration of stimulation of the remote collar 10, a battery supply and slave receiver circuits for receiving electronic slave control signals 32 from a slave transmitter 30 (also shown in FIG. 1). Master transmitter 20, may be used without the slave transmitter 30 to control the animal collar 10.

Figure 6:
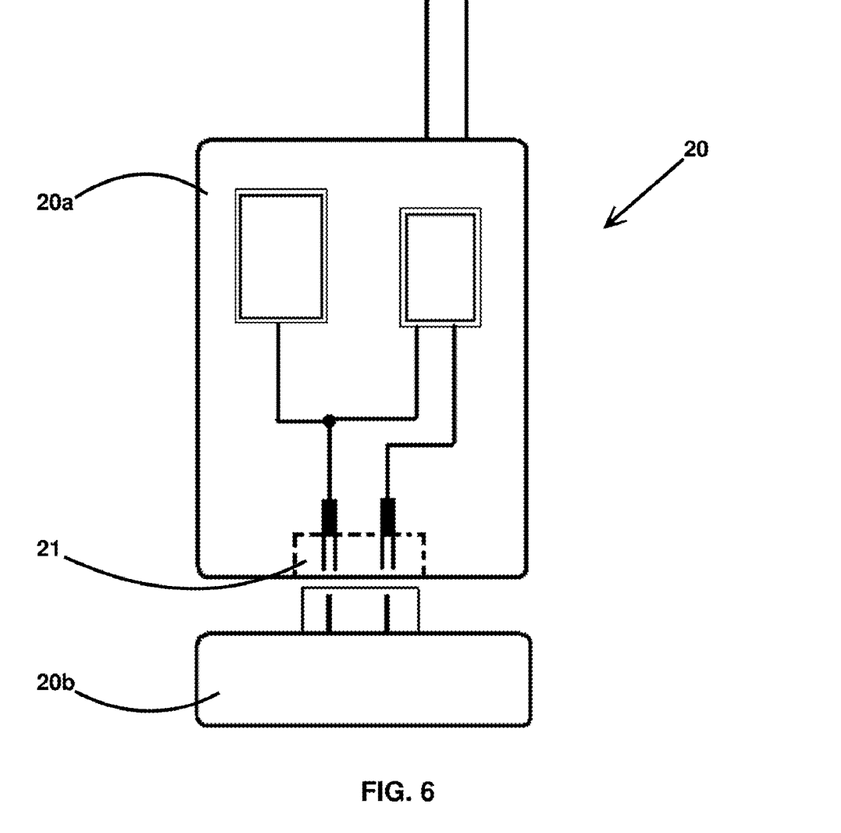
FIG. 6 shows a modified master transmitter unit including a basic transmitter component and an adapter component for adding the necessary receiver circuits and software for communicating with a slave transmitter.

In an alternative arrangement, as illustrated graphically in FIG. 6, the master transmitter 20 may be constructed as two separate components. A first basic transmitter component 20a that does not include the necessary receiver circuits and software required for receiving electronic slave control signals 32 from the slave transmitter 30 and for using those signals to control the master control signals 22 output to the animal collar 10, and a second add-on transmitter adapter unit 20b that does include the required receiver circuits and software. In this alternate arrangement, the basic transmitter component 20a includes an adapter component 21 comprising an adapter unit plug and basic adapter circuitry to permit the connection and operation of the adapter unit 20b. It is contemplated by the applicant that to save initial costs, the basic transmitter unit 20a could be sold separately from the adapter unit 20b, and that the adapter unit 20b could be purchased later as an add-on device.

Figure 2:
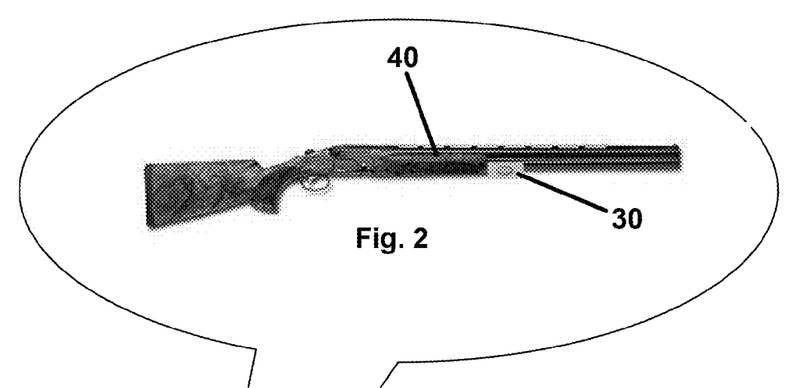
FIG. 2 shows the slave transmitter mounted to a weapon.
Figure 3:
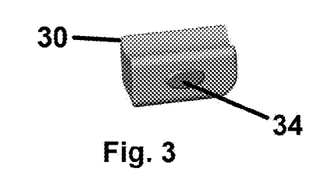
FIG. 3 shows one side of the slave transmitter.
Figure 4:
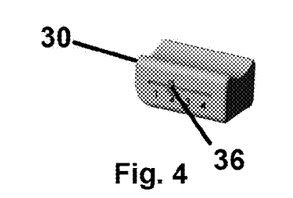
FIG. 4 shows a second side of the slave transmitter.
Figure 16:
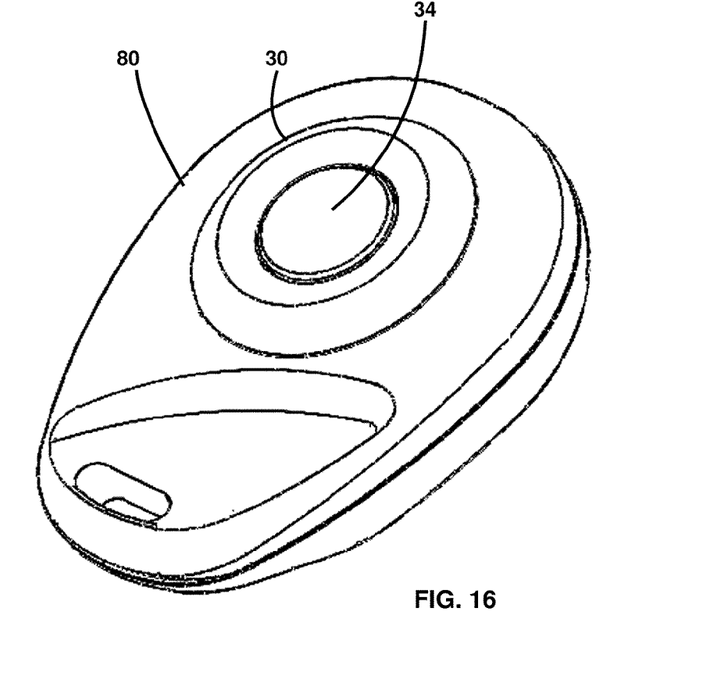
FIG. 16 shows a slave transmitter mounted in a key chain holder.

As shown in FIGS. 1 and 2, the slave transmitter 30, is used for sending electronic slave control signals 32 to the master transmitter 20. The slave transmitter 30 may be mounted on the barrel of a gun 40, for easy access by the hunter. The slave transmitter 30 is low-powered, since it only needs to communicate a few feet to the master transmitter 20 located in the hunter's pocket, and therefore can be made small and light. It may be mounted on the hunter's gun 40 as shown in FIGS. 1 and 2, but also may be located in a convenient place on the hunter's clothing, on a key chain or holder 80 (as shown in FIG. 16), on a handling stick, or mounted on the hunter's hand or watch or other similar devices. The slave transmitter 30 requires only a very small battery, low-powered communication circuits, and limited software, since its only purpose is to communicate a short distance to the master transmitter 20. The slave transmitter 30 may operate at a frequency of about 27 Mhz (or some other suitable frequency) to a range of up to about 30 feet. Slave transmitter 30 may have a key pad (not shown) with multiple buttons for controlling multiple types, levels and duration of stimulation or it may have a single button 34 to activate stimulation control, and an animal collar selector switch 36 for selection of one of several remote animal collars 10.

In operation, when the hunter needs to modify the behavior of the animal for any reason, the selector 36 on slave transmitter 30 is set to the desired animal collar, and the key pad or button 34 is pressed to issue slave control signals 32. The slave control signal is transmitted the short distance from the slave transmitter 30 to the mater transmitter 20, which receives the slave control signal, and in turn transmits the master remote control signal 22 to the remote animal collar 10 corresponding to the level, type and duration of stimulation selected by the hunter.

Because the master remote control signal 22 is initiated by the slave control signal 32 issued by the slave transmitter 30 mounted on the hunter's weapon, the hunter need not remove his hands from his weapon to issue a correction stimulation to the animal to prevent "breaking".

The applicant's remote control system described herein may be used in many different dog hunting or training applications. In these applications, it is important to have the slave transmitter 30 mounted in a convenient location for easy and quick access by the operator. In a hunting scenario, as mentioned above, it is advantageous to locate the slave transmitter directly on, in, or attached to the hunter's weapon 40.

As shown in FIGS. 2-4 and 14, the slave transmitter 30 may be constructed of plastic or some other suitable material so as to conform to the underside of the weapon's gun barrel so that it simply "snap-fits" onto the barrel in a convenient location. Adjustment sleeves, as shown in FIG. 16, may be used to facilitate attachment to various sizes of gun barrels.

In the alternative, to facilitate the attachment of the slave transmitter 30 to the hunter's weapon 40, the weapon may be modified in various ways to provide a handy location for attaching the slave transmitter 30. It is important that the slave transmitter 30 be attached in a location that facilitates easy and quick access to the slave transmitter by the hunter, permitting the hunter to activate the remote animal collar 10 within the above-described one second time frame so as to provide an effective correction to the animal.

Figure 7:
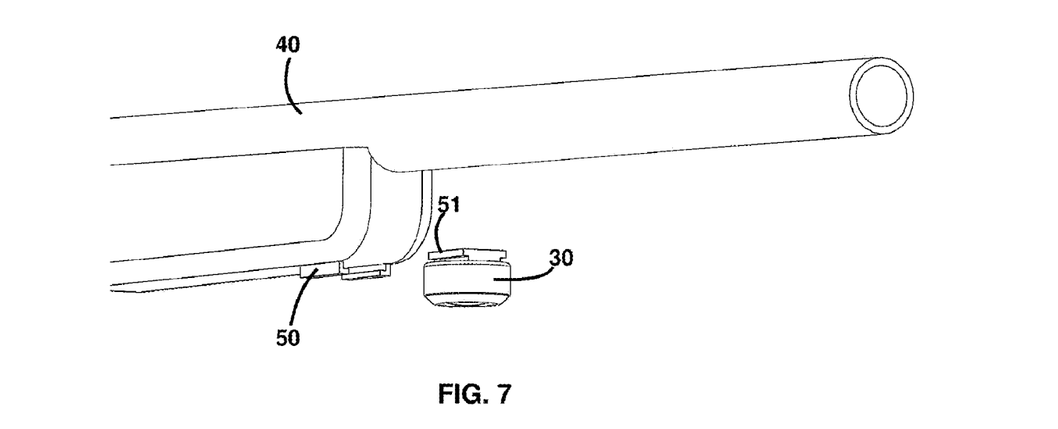
FIG. 7 shows a weapon that has been modified to facilitate the attachment of a correspondingly modified slave transmitter.

As shown in FIG. 7, the modification to the weapon 40 could be in the form of a flange or a groove 50 or some other feature incorporated into the weapon at some convenient location, the flange or groove 50 or other feature being adapted to engage with a corresponding feature 51 on the slave transmitter 30 so as to thereby result in the attachment of the slave transmitter 30 to the weapon 40 by engagement of the mutually corresponding features.

Figure 8A:
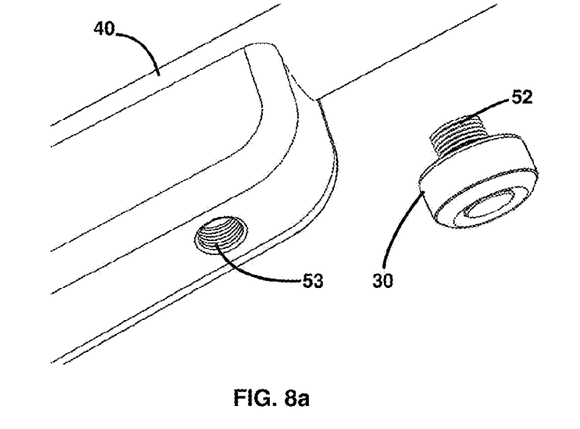
FIGS. 8a and 8b show a slave transmitter and weapon adapted for screw-type mounting of the slave transmitter to the weapon.
Figure 8B:
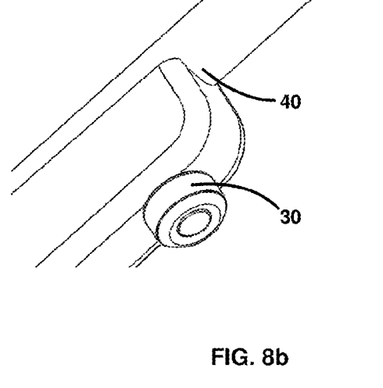

As shown in FIGS. 8a and 8b, the slave transmitter 30 could be fitted with a small threaded bolt or screw 52 that screws into a threaded hole 53 in the modified weapon 40 to secure the slave transmitter to the weapon in a convenient location.

Such modification of the weapon 40 could also be achieved by providing a convenient spring clip receiving portion (not shown) similar to the flange or groove 50 shown in FIG. 7, for attachment of a spring clip, or some other such attachment means affixed to the slave transmitter 30.

The modification could be the addition of a magnetic attachment means (not shown) to the weapon to be used for attaching and holding the slave transmitter in a convenient location.

Figure 9A:
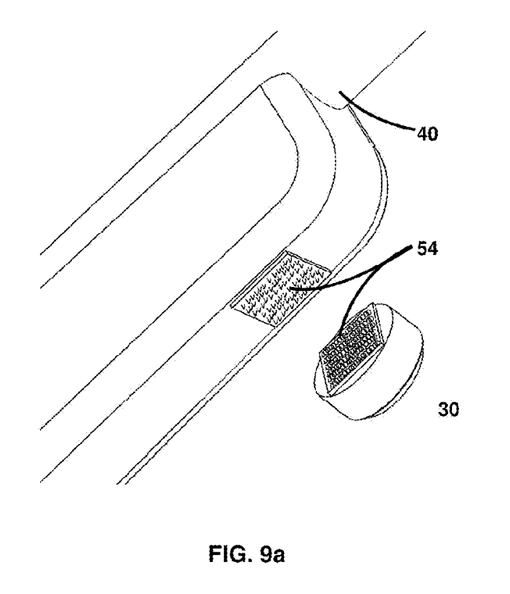
FIGS. 9a and 9b show a slave transmitter and weapon adapted for mounting the slave transmitter to the weapon with VELCRO.
Figure 9B:
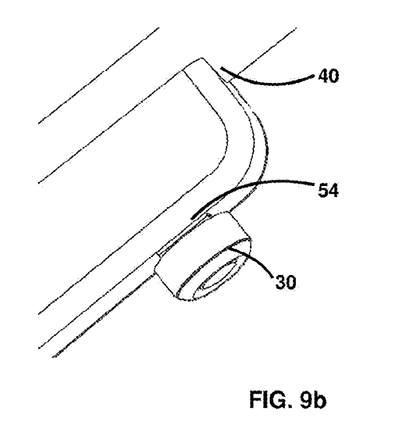

As shown in FIGS. 9a and 9b, the modification could be the addition of VELCRO attachment means 54 to the weapon 40 and to the slave transmitter 30 to be used for attaching and holding the slave transmitter in a convenient location.

Those skilled in the art will appreciate that the weapon could be modified and adapted to include many different types of common attachment means for attaching the slave transmitter to the weapon in a convenient location to facilitate activation of the slave transmitter within the one second time frame.

Figures 10A, 10B:
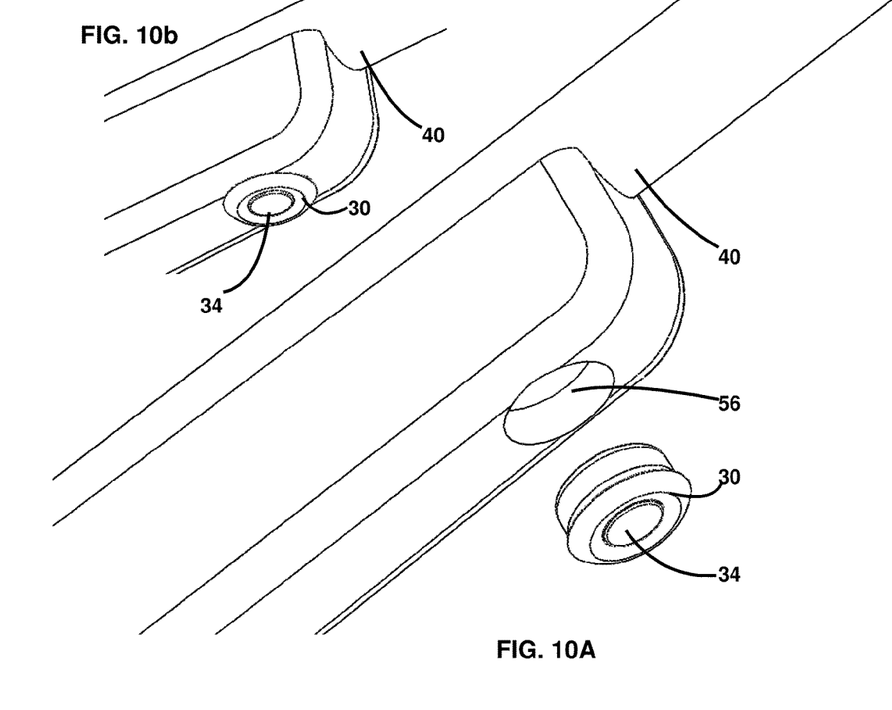
FIGS. 10a and 10b show a weapon that has been modified by adding a cutout area to the stock to accept a slave transmitter.

In a further example, as shown in FIGS. 10a and 10b, the weapon 40 may have a specially designed cutout area 56 incorporated directly into the stock or forearm area. Such cutout 56 could be pre-drilled and covered with a plastic or metal cover that could be easily removed to accept the slave transmitter 30 should the hunter wish to use the applicant's remote control system. The cutout 56 could be designed and sized to accept and hold the slave transmitter 30 by a friction fit method, or any number of commonly known snap-in locking systems could be incorporated to hold the slave transmitter 30 securely within the cutout area. A magnetic holding system, as described above, could be incorporated into the cutout or VELCRO could be added as well and combined with the cutout area. Advantageously, the cutout area 56 is designed to accept the slave transmitter 30 in an integrated manner such that the slave transmitter is flush with, or does not protrude excessively beyond the existing surface of the weapon, as shown in FIG. 10b, while at the same time still providing easy and convenient access to the button 34.

It is also contemplated by the applicant to manufacture replacement components for existing weapons, such as gun stocks and barrels that have been modified as described above to facilitate the attachment of the slave transmitter 30.

Figure 11A:
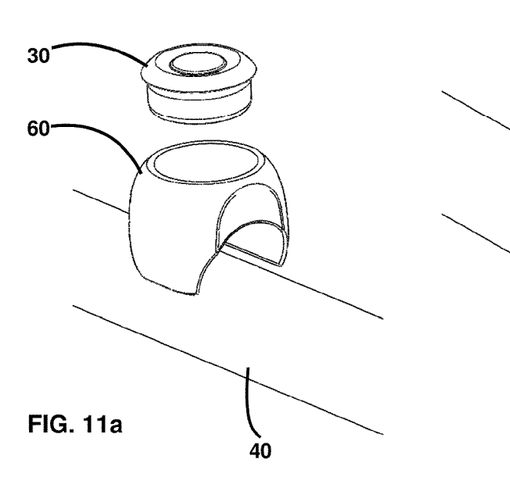
FIGS. 11a and 11b show a slave transmitter holder, including a slave transmitter mounted to the barrel of a weapon by friction fitting.
Figure 11B:
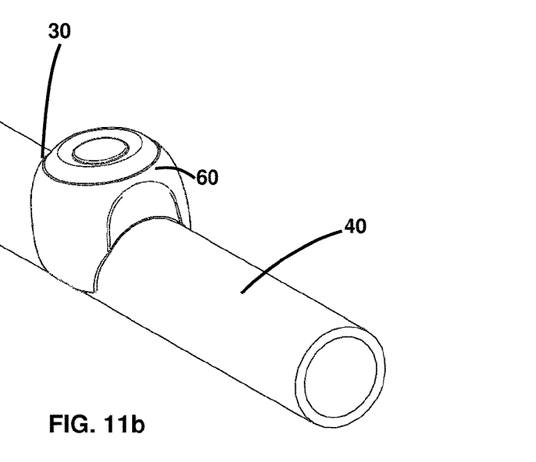
Figure 12A:
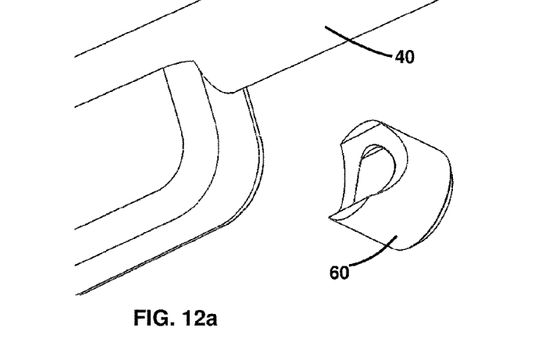
FIGS. 12a and 12b show a slave transmitter holder adapted for magnetic attachment to the barrel of a weapon.
Figure 12B:
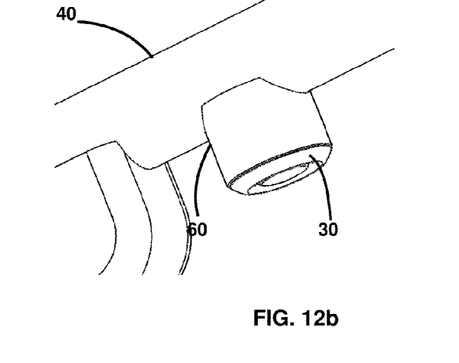

It is further contemplated by the applicant to make a slave transmitter holder 60, like that shown in FIGS. 11a and 11b. The holder can be adapted to securely hold the slave transmitter 30 and then to be securely mounted to the weapon 40 as shown. The holder 60 can be made to facilitate mounting to a standard, unmodified weapon, for example by friction fitting as described above and shown in FIGS. 11a and 11b, or by making the holder magnetic so that it will easily attach to a metal gun barrel as shown in FIGS. 12a and 12b. In the alternative, the holder 60 may be constructed so as to be attachable to a weapon that has been specially modified in the manners as described above to facilitate the attachment of the slave transmitter 30 or the slave transmitter holder 60, for example by a flange and groove type attachment (see FIG. 7), a spring clip, by a screw-type attachment (see FIGS. 8a and 8b), by VELCRO (see FIGS. 9a and 9b), magnetically (FIGS. 12a and 12b), or by fitting into a cutout area on the weapon (see FIGS. 10a and 10b).

Figure 13:
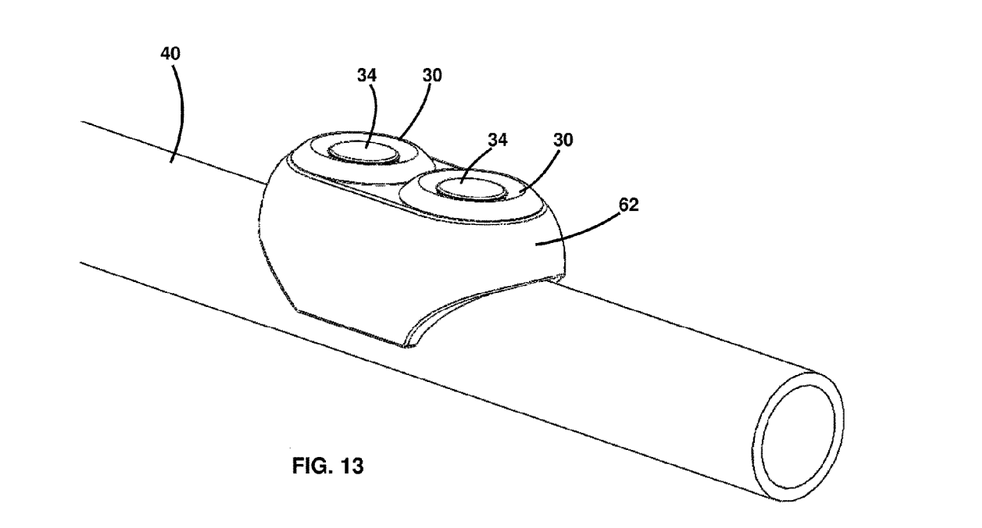
FIG. 13 shows a slave transmitter holder for holding two slave transmitters.
Figure 14:
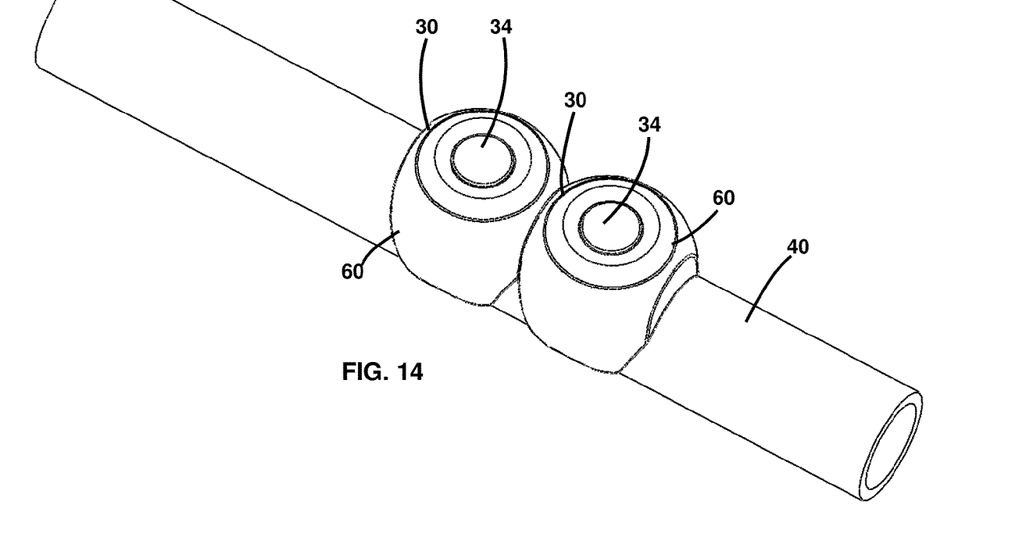
FIG. 14 shows two slave transmitters mounted on a single weapon.

As shown in FIG. 13, a slave multi-holder 62 may be constructed to hold more than one slave transmitter. Each slave transmitter may be set to control a different collar 10, giving the hunter or trainer the ability to control more than one animal at the same time. In the alternative, each slave transmitter could be set to correspond to a different level of stimulation for the same collar 10, giving the hunter or trainer the ability to vary the intensity of corrective stimulation given to the animal without making any further adjustments. The two or more slave transmitters 30 may be housed in one multi-holder 62, as shown in FIG. 13, or in separate holders 60, as shown in FIG. 14.

Figure 15A:
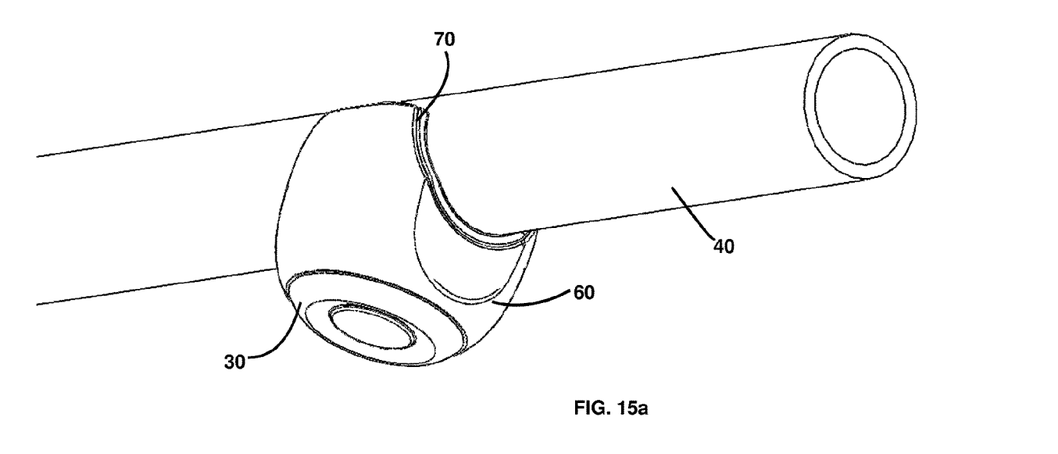
FIGS. 15a-c show a slave transmitter holder, including a slave transmitter, mounted to a weapon using an adjustment sleeve.
Figure 15B:
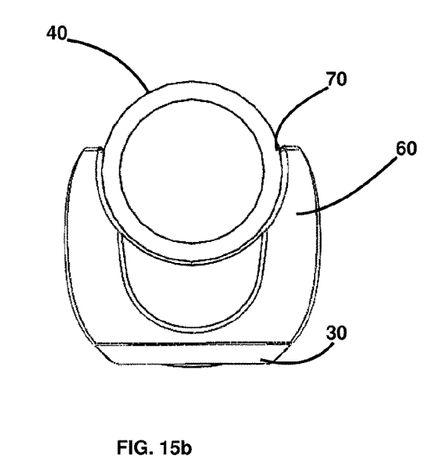
Figure 15C:
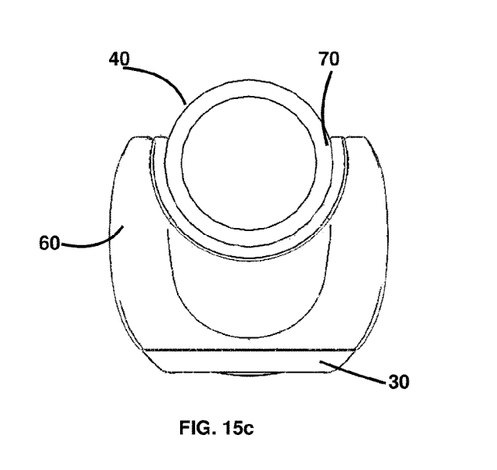

FIGS. 15a to 15c, show slave transmitter holder 60 attached to weapon 40 by friction fit. An adjustment sleeve 70 is included to enable fitting to different size weapons. For example, FIG. 15b shows attachment to a 12-guage shot gun barrel, while FIG. 15c shows attachment to a 20-guage shot gun barrel.

The previous detailed description is provided to enable any person skilled in the art to make or use the present remote control system for controlling a remote animal collar. Various modifications to those embodiments will be readily apparent to those skilled in the art, and the generic principles defined herein may be applied to other embodiments without departing from the spirit or scope of the remote control system described herein. Thus, the present remote control system is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

I claim:

1. A remote control system for controlling an animal, the remote control system comprising:
    an animal collar for attachment to the animal, the animal collar comprising one or more stimulation devices for providing a stimulation to the animal and receiver circuits for receiving master control signals for controlling the one or more stimulation devices;
    a slave transmitter for transmitting slave control signals corresponding to a selected type, level, and/or duration of the stimulation;
    a master transmitter comprising receiver circuits for receiving the slave control signals from the slave transmitter and transmitter circuits for transmitting the master control signals to the animal collar for controlling the one or more stimulation devices, the master control signals corresponding to the selected type, level, and/or duration of the stimulation provided by the slave control signals; and
    attachment means for conveniently attaching the slave transmitter to a hunting weapon without modification of the hunting weapon, for controlling the animal directly from the hunting weapon.

2. The remote control system of claim 1, wherein the master transmitter has a transmission range that is longer than the transmission range of the slave transmitter.

3. The remote control system of claim 1, wherein the slave transmitter includes an animal collar selector switch for selecting one of a multiple number of animal collars to control.

4. The remote control system of claim 1, wherein the attachment means is for attaching the slave transmitter in a convenient location on the hunting weapon so that the slave transmitter may be easily activated to send the slave control signals without releasing hold of the hunting weapon.

5. The remote control system of claim 1, wherein the attachment means is magnetic.

6. The remote control system of claim 1, wherein the attachment means is a VELCRO holding system.

7. The remote control system of claim 1, wherein the attachment means comprises a snap-fit between the slave transmitter and the hunting weapon.

8. The remote control system of claim 1, wherein the attachment means comprises a groove on the slave transmitter for engaging with a corresponding flange attachable to the hunting weapon.

9. The remote control system of claim 1, wherein the attachment means comprises a flange on the slave transmitter for engaging with a corresponding groove on the hunting weapon.

10. The remote control system of claim 1, wherein the attachment means includes a holder for securely holding the slave transmitter.

11. The remote control system of claim 10, wherein the holder is shaped to be mounted to the hunting weapon by a friction fit.

12. A remote control system for controlling an animal, the remote control system comprising:
- an animal collar for attachment to the animal, the animal collar comprising one or more stimulation devices for providing a stimulation to the animal and receiver circuits for receiving master control signals for controlling the one or more stimulation devices;
- a slave transmitter for transmitting slave control signals corresponding to at least one of a selected type, a selected level, and a selected duration of the stimulation;
- a master transmitter comprising receiver circuits for receiving the slave control signals from the slave transmitter and transmitter circuits for transmitting the master control signals to the animal collar for controlling the one or more stimulation devices, the master control signals corresponding to the at least one of the selected type, the selected level, and the selected duration of the stimulation provided by the slave control signals;
- a hunting weapon; and
- attachment means for conveniently attaching the slave transmitter to the hunting weapon for controlling the animal directly from the hunting weapon.

13. The remote control system of claim 12, wherein the master transmitter has a transmission range that is longer than the transmission range of the slave transmitter.

14. The remote control system of claim 12, wherein the slave transmitter includes an animal collar selector switch for selecting one of a multiple number of animal collars to control.

15. The remote control system of claim 12, wherein the attachment means is for attaching the slave transmitter in a convenient location on the hunting weapon so that the slave transmitter may be easily activated to send the slave control signals without releasing hold of the hunting weapon.

16. The remote control system of claim 12, wherein the attachment means comprises a friction fit between the slave transmitter and a cutout area in a stock or a forearm area of the hunting weapon, the cutout area being sized to receive and hold the slave transmitter.

17. The remote control system of claim 16, wherein the cutout area and the slave transmitter are sized so that the slave transmitter is held approximately flush with an outside surface of the stock or forearm of the hunting weapon.

18. The remote control system of claim 12, wherein the attachment means is magnetic.

19. The remote control system of claim 12, wherein the attachment means is a VELCRO holding system.

20. The remote control system of claim 12, wherein the attachment means comprises a snap-fit between the slave transmitter and the hunting weapon.

21. The remote control system of claim 12, wherein the attachment means comprises a groove on the slave transmitter for engaging with a corresponding flange on the hunting weapon.

22. The remote control system of claim 12, wherein the attachment means comprises a flange on the slave transmitter for engaging with a corresponding groove on the hunting weapon.

23. The remote control system of claim 12, wherein the attachment means is a threaded attachment.

24. The remote control system of claim 12, wherein the attachment means includes a holder for securely holding the slave transmitter.

25. The remote control system of claim 24, wherein the holder is shaped to be mounted to the hunting weapon by a friction fit.

* * * * *